United States Patent
Rush et al.

(10) Patent No.: US 10,353,858 B2
(45) Date of Patent: Jul. 16, 2019

(54) SYSTEM AND METHOD FOR MANAGING SYSTEM MEMORY INTEGRITY IN SUSPENDED ELECTRONIC CONTROL UNITS

(71) Applicant: GM Global Technology Operations LLC, Detroit, MI (US)

(72) Inventors: Scott A. Rush, West Bloomfield, MI (US); Vadim Draluk, Cupertino, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 25 days.

(21) Appl. No.: 15/845,254

(22) Filed: Dec. 18, 2017

(65) Prior Publication Data
US 2019/0188039 A1    Jun. 20, 2019

(51) Int. Cl.
| G06F 15/17 | (2006.01) |
| G06F 9/50 | (2006.01) |
| G06F 1/32 | (2019.01) |
| G06F 1/24 | (2006.01) |
| G06F 15/177 | (2006.01) |
| G06F 1/3206 | (2019.01) |

(52) U.S. Cl.
CPC .............. *G06F 15/177* (2013.01); *G06F 1/24* (2013.01); *G06F 1/3206* (2013.01); *G06F 9/5016* (2013.01)

(58) Field of Classification Search
CPC ........ G06F 15/177; G06F 1/24; G06F 1/3206; G06F 9/5016
See application file for complete search history.

(56) References Cited

U.S. PATENT DOCUMENTS

| 7,089,433 B2 * | 8/2006 | Chaiken | G06F 9/4418 713/300 |
| 7,210,009 B2 * | 4/2007 | Gulick | G06F 21/74 711/156 |
| 9,383,801 B2 * | 7/2016 | Branover | G06F 1/3234 |

OTHER PUBLICATIONS

Johansson, K.H., Torngren, M. And Nielsen, L.; "Vehicle Applications of Controller Area Network"; Technical Report, Department of Signals, Sensors and Systems, Royal Institute of Technology, Stockholm, Sweden, and Department of Electrical Engineering, Linkoping University, Sweden; 2003; 25 pages.
CAN bus; Wikipedia; https://en.wikipedia.org/wiki/CAN_bus; printed on Dec. 14, 2017; 15 pages.

* cited by examiner

*Primary Examiner* — Stefan Stoynov

(57) ABSTRACT

A system for controlling a subsystem of a vehicle includes a memory, a first processor, and a second processor. The first processor allocates a portion of the memory upon booting to perform operations to control the subsystem and generates an indication when an amount of memory used from the allocated portion of the memory is greater than or equal to a threshold. The first processor monitors times when the vehicle is turned on and off and determines a time period during which the vehicle remains turned off. After the vehicle is turned off, the first processor enters a power save mode. The memory and the second processor continue to receive power. During the time period, on receiving the indication, the second processor wakes up the first processor, which performs a reboot operation, reallocates the memory, and reenters the power save mode. The memory continues to receive power.

20 Claims, 2 Drawing Sheets

SYSTEM AND METHOD FOR MANAGING SYSTEM MEMORY INTEGRITY IN SUSPENDED ELECTRONIC CONTROL UNITS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to managing system memory integrity in suspended electronic control units.

Automotive electronic control systems are typically implemented as electronic control units (ECU's) that are connected to each other by a Controller Area Network (CAN) bus. Each ECU controls a specific subsystem (e.g., engine, transmission, heating and cooling, infotainment, navigation, and so on) of the vehicle. Each ECU includes a microcontroller, a CAN controller, and a transceiver. In each ECU, the microcontroller includes a processor, memory, and other circuits to control the specific subsystem. Each ECU can communicate with other ECU's via the CAN bus through the CAN controller and the transceiver.

SUMMARY

A system for controlling a subsystem of a vehicle includes a memory, a first processor, and a second processor. The first processor is configured to control the subsystem of the vehicle. The first processor is configured to allocate, upon booting, a portion of the memory to perform operations to control the subsystem. The first processor is configured to generate an indication when an amount of memory used from the allocated portion of the memory is greater than or equal to a threshold. The first processor is configured to monitor times when the vehicle is turned on and off and to determine, based on the times, a time period during which the vehicle remains turned off. The first processor is configured to enter a power save mode after the vehicle is turned off while the memory continues to receive power after the vehicle is turned off. The second processor is configured to continue receiving power after the vehicle is turned off. After the vehicle is turned off, in response to receiving the indication from the first processor, the second processor is configured to wake up the first processor from the power save mode during the time period in which the vehicle remains turned off. The first processor is further configured to, in response to waking up during the time period and while the vehicle remains turned off, perform a reboot operation, reallocate the memory, and reenter the power save mode while the memory continues to receive power.

In other features, when the vehicle is turned on after the reboot operation, the first processor is configured to control the subsystem based on data present in the memory from before the vehicle is turned on. Alternatively or additionally, when the vehicle is turned on after the reboot operation, the first processor is configured to wake up from the power save mode to control the subsystem using the memory without rebooting. Alternatively or additionally, when the vehicle is turned on after the reboot operation, the first processor is configured to control the subsystem without rebooting.

In other features, when the vehicle is turned on prior to the reboot operation, the first processor is configured to not alter allocation of the memory from a prior reboot operation, and to continue to operate without rebooting and by using contents of the memory from before the vehicle is turned on.

In other features, when the vehicle is turned on prior to the reboot operation, the first processor is configured to execute programs based on a memory allocation performed at a prior reboot operation.

In other features, when the vehicle is turned on after the reboot operation, the subsystem becomes available for use in less time than if the first processor is rebooted after the vehicle is turned on.

In other features, the first processor is configured to monitor a usage of the allocated portion of the memory since a prior reboot operation. The first processor is configured to determine whether to perform the reboot operation during the time period based on the usage of the allocated portion of the memory. The first processor is configured to generate the indication based on determining whether to perform the reboot operation during the time period based on the usage of the allocated portion of the memory.

In other features, the first processor is configured to determine a usage of the allocated portion of the memory during a time for which the first processor operates without rebooting. The first processor is configured to determine whether to perform the reboot operation during the time period based on the usage of the allocated portion of the memory.

In other features, in response to the reboot operation, the first processor is configured to initialize the memory, load programs into the memory for execution by the first processor, and allocate portions of the memory to the programs.

In still other features, a method comprises controlling a subsystem of a vehicle using a first processor, a second processor, and a memory. The method further comprises allocating, using the first processor, upon booting, a portion of the memory to perform operations to control the subsystem. The method further comprises generating, using the first processor, an indication when an amount of memory used from the allocated portion of the memory is greater than or equal to a threshold. The method further comprises monitoring, using the first processor, times when the vehicle is turned on and off; and determining, using the first processor, based on the times, a time period during which the vehicle remains turned off. The method further comprises operating the first processor in a power save mode after the vehicle is turned off, continuing to supply power to the memory after the vehicle is turned off, and continuing to supply power to the second processor after the vehicle is turned off. After the vehicle is turned off, in response to receiving the indication from the first processor, the method further comprises waking up the first processor from the power save mode during the time period in which the vehicle remains turned off. The method further comprises, in response to waking up during the time period and while the vehicle remains turned off, performing a reboot operation using the first processor, reallocating the memory using the first processor, and returning the first processor to the power save mode while continuing to supply power to the memory.

In other features, when the vehicle is turned on after the reboot operation, the method further comprises controlling the subsystem using the first processor based on data present in the memory from before the vehicle is turned on.

In other features, when the vehicle is turned on after the reboot operation, the method further comprises waking up the first processor from the power save mode, and controlling the subsystem using the first processor and the memory without rebooting.

In other features, when the vehicle is turned on after the reboot operation, the method further comprises controlling the subsystem using the first processor without rebooting.

In other features, when the vehicle is turned on prior to the reboot operation, the method further comprises not altering allocation of the memory from a prior reboot operation, and continuing to operate the first processor without rebooting and by using contents of the memory from before the vehicle is turned on.

In other features, when the vehicle is turned on prior to the reboot operation, the method further comprises executing programs using the first processor based on a memory allocation performed at a prior reboot operation.

In other features, when the vehicle is turned on after the reboot operation, the method further comprises making the subsystem available for use in less time than if the first processor is rebooted after the vehicle is turned on.

In other features, the method further comprises monitoring, using the first processor, a usage of the allocated portion of the memory since a prior reboot operation. The method further comprises determining, using the first processor, whether to perform the reboot operation during the time period based on the usage of the allocated portion of the memory. The method further comprises generating, using the first processor, the indication based on determining whether to perform the reboot operation during the time period based on the usage of the allocated portion of the memory.

In other features, the method further comprises determining, using the first processor, a usage of the allocated portion of the memory during a time for which the first processor operates without rebooting. The method further comprises determining, using the first processor, whether to perform the reboot operation during the time period based on the usage of the allocated portion of the memory.

In other features, the method further comprises, in response to the reboot operation, using the first processor, initializing the memory, loading programs into the memory for execution by the first processor, and allocating portions of the memory to the programs.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
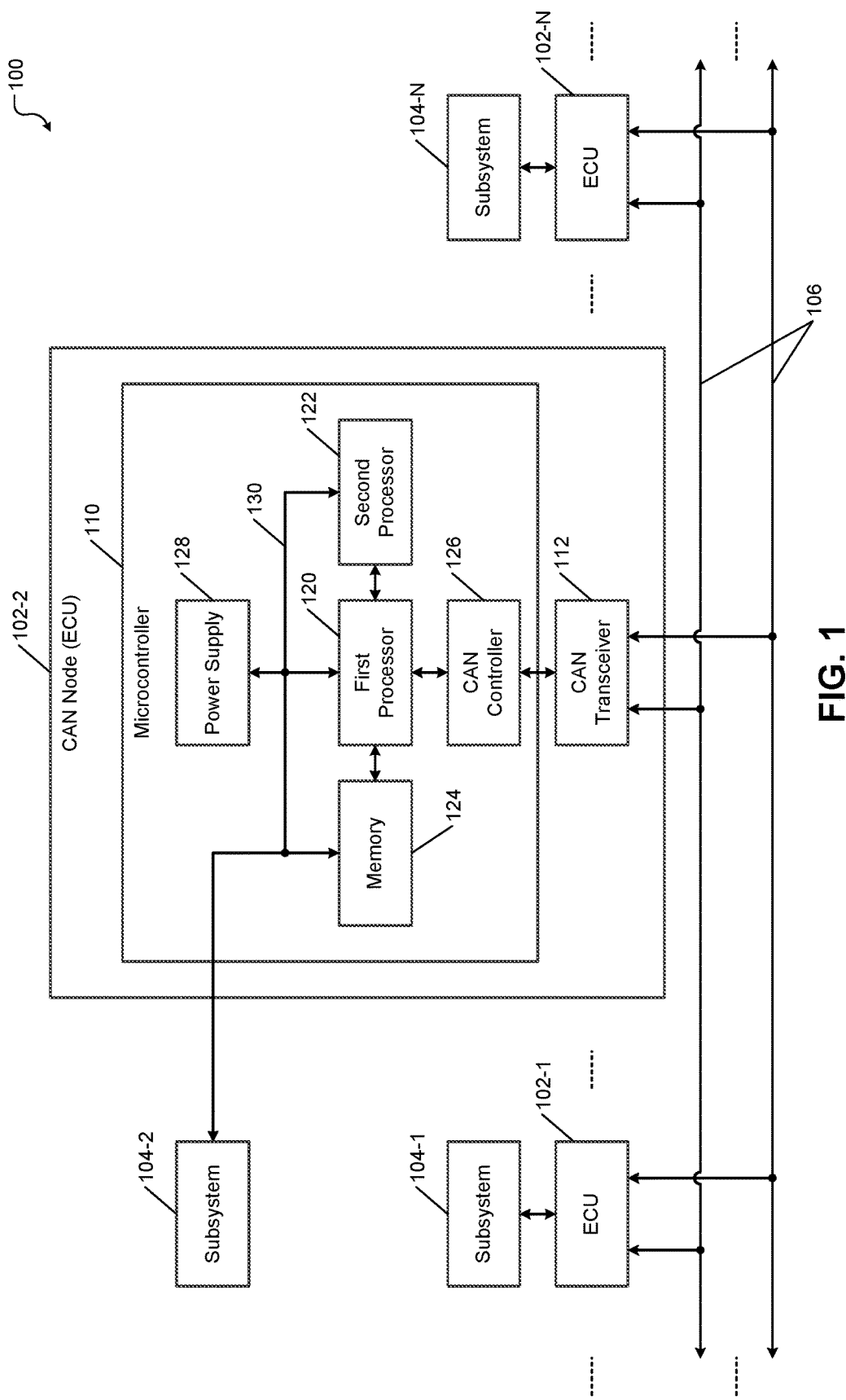
FIG. 1 is a functional block diagram of an electronic control unit (ECU) to operate a subsystem of a vehicle according to the present disclosure.

Typically, the electronic control units (ECU's) are shut down and turned off when a vehicle is turned off. The ECU's are turned on and rebooted when the vehicle is turned on. The amount of time taken by an ECU to turn on and reboot after the vehicle is turned on (also called a cold start) can vary depending on the complexity of the system controlled by the ECU. For example, an infotainment system of the vehicle can include various types of radios (e.g., AM/FM, satellite, and so on), a navigation system, a multimedia system, and so on. Accordingly, the ECU that controls the infotainment system can include complex hardware and software, which can take a relatively long time to reboot as compared to an ECU that controls a relatively less complex system.

Instead of rebooting the ECU each time the vehicle is turned on (i.e., instead of cold starting the ECU when the vehicle is turned on), the following procedure can be used to quickly put the ECU in a stable state in which the ECU is ready for use when the vehicle is turned on. Specifically, when the vehicle is turned off, the ECU is not shut down and not turned off. Instead, the ECU is placed in a suspend mode where the processor(s) of the ECU are turned off or placed in a power save mode while the volatile memory (e.g., RAM) of the ECU is not turned off (i.e., not powered down) for a period of time. Consequently, the content of the volatile memory, which includes code and data that are loaded when the ECU boots, is preserved for this period of time. This mode of operation of the ECU in which the processor(s) of the ECU are turned off or placed in a power save mode while the volatile memory (e.g., RAM) of the ECU is not turned off (i.e., not powered down) for a period of time is called suspend mode operation.

When the vehicle is turned on within the period of time for which the content of the volatile memory is preserved, the rebooting of the ECU is unnecessary and can be skipped since the code and data for operating the ECU are already present in the volatile memory. Therefore, instead of cold starting the ECU, only the processor(s) of the ECU are powered on or brought out of the power save mode and placed into normal operating mode, and the ECU enters into the stable state and is ready for use much faster than the time the ECU would take to reboot (i.e., to cold start). Accordingly, operating the ECU's in the suspend mode eliminates the rebooting or cold starting of the ECU's when the vehicle is turned on within the period of time for which the content of the volatile memory is preserved; and without the reboot or cold start, the ECU becomes operational (i.e., ready for use) much faster when the vehicle is turned on.

However, eliminating the rebooting of the ECU also prevents flushing or resetting (i.e., initialization and allocation) of the volatile memory in the ECU, which typically occurs when the ECU is cold started (i.e., booted) after the vehicle is turned on. During the flushing or resetting of the volatile memory at cold start, portions of the volatile memory are allocated to different portions of the code being executed by the ECU. When the suspend mode is used and the vehicle is turned on, without the reboot, the code in the volatile memory continues to execute with the memory allocation performed at the last reboot. As the code continues to execute when the vehicle is turned on, the memory usage (i.e., utilization of allocated memory) continues to grow. Since the memory allocation is not reset until the next reboot, this growth in memory usage (i.e., reduction in available allocated memory) can eventually lead to a shortage of available allocated memory, which can hinder the execution of the code. In some ECU's, the shortage of available memory can cause potentially unstable conditions, where the operation of one or more subsystems controlled by the ECU's can become unreliable.

The present disclosure proposes systems and methods for eliminating the problem of growing memory usage causing potentially unstable conditions that can occur when the ECU's are operated in the suspend mode. Specifically, the present disclosure proposes systems and methods for monitoring vehicle usage, determining an optimum time when the vehicle is unused, monitoring memory usage during uptime of the ECU's, determining whether the ECU's should be rebooted, rebooting the ECU's during the optimum time, and placing the ECU's in the suspend mode. Since the rebooting of the ECU's is performed while the vehicle is unused, the user of the vehicle is unaware of the rebooting process, and the operation of the vehicle is unaffected by the rebooting process. Further, when the vehicle is turned on, the volatile memory and its contents are ready for use with the desired memory allocation without performing a reboot after the vehicle is turned on, and the ECU's are in a stable operational and usable state.

FIG. 1 shows an example of a plurality of ECU's connected to each other by a CAN bus in a vehicle 100. The plurality of ECU's includes ECU-1 102-1, ECU-2 102-2, . . . , ECU-N 102-N (collectively, ECU's 102), where N is an integer greater than one. Hereinafter, ECU 102 refers to any of the plurality of ECU's 102. While FIG. 1 shows a detailed functional block diagram of only the ECU-2 102-2, it will be understood that other ECUs 102 can have structure similar to the ECU-2 102-2. Each ECU 102 or any portion thereof may be implemented as one or more modules.

Each ECU 102 controls a respective subsystem of the vehicle 100. For example, the ECU-1 102-1 controls a subsystem 104-1, the ECU-2 102-2 controls a subsystem 104-2, . . . , and the ECU-2 102-N controls a subsystem 104-N. Collectively, the subsystems 104-1, 104-2, . . . , 104-N are referred to as subsystems 104. Examples of the subsystems 104 include but are not limited to an infotainment subsystem, an engine control subsystem, a transmission control subsystem, a brake control subsystem, an exhaust controlled subsystem, a traction control subsystem, a suspension control subsystem, a climate control subsystem, a safety subsystem, and so on. Each subsystem 104 may include one or more sensors to sense data from one or more components of the subsystem. Each subsystem 104 may include one or more actuators to actuate one or more components of the subsystem.

An ECU 102 may receive data from one or more sensors of a corresponding subsystem 104. Depending on the type of ECU, the ECU 102 may also receive one or more inputs from an occupant of the vehicle 100. The ECU 102 may control one or more actuators of the corresponding subsystem 104 based on the data received from the one or more sensors and/or the one or more inputs from an occupant of the vehicle 100.

The ECUs 102 are connected to a CAN bus 106. The ECUs 102 can communicate with each other via the CAN bus 106. The ECUs 102 can communicate with other devices connected to the CAN bus 106. Each ECU 102 includes a microcontroller 110 and a CAN transceiver 112. The microcontroller 110 communicates with the subsystem 104 controlled by the ECU 102. The CAN transceiver 112 communicates with the CAN bus 106.

The microcontroller 110 includes a first processor 120, a second processor 122, a memory 124, a CAN controller 126, and a power supply 128. The power supply 128 supplies power to all of the components of the microcontroller 110 and the ECU 102. The CAN controller 126 communicates with the CAN transceiver 112. The first processor 120, the second processor 122, and the memory 124 communicate with each other via a bus 130. The first processor 120 and the second processor 122 execute code stored in the memory 124 to control the subsystem 104.

The memory 124 includes volatile memory (RAM) and may additionally include nonvolatile memory (e.g., flash memory) and/or other type of data storage device(s). The memory 124 is used to store code that is executed by the first processor 120 and the second processor 122. For example, the code may be stored in the nonvolatile memory, and the code (or a portion of the code) may be loaded into the volatile memory when the ECU 102 boots (e.g., when the vehicle 100 is turned on; or when the vehicle 100 is turned off, using the inventive procedure described below). Alternatively or additionally, the memory 124 may receive code from other sources via the CAN bus 106. For convenience, throughout the remainder of the present disclosure, the memory 124 refers to the volatile portion of the memory 124, which requires power supply to retain data stored therein.

The first processor 120 executes the code to control the subsystem 104. When the ECU 102 boots, portions of the memory 124 are allocated to portions of the code executed by the first processor 120. The memory allocation indicates amounts of the memory 124 allocated to the portions of the code. As the first processor 120 executes the code, the portions of the code keep consuming the respective allocated portions of the memory 124. As the consumption of the allocated memory 124 grows beyond a threshold, the ECU 102 may be unable to reliably control the subsystem 104, and the ECU 102 may need to be rebooted to initialize the memory 124 and reset the memory allocation. After the memory 124 is initialized and the memory allocation is reset (i.e., the memory 124 is reallocated), the first processor 120 can again reliably control the subsystem 104.

The first processor 120 detects (e.g., through data received via the CAN bus 106) when the vehicle 100 is turned on and off. The power supply 128 supplies power to all of the components of the microcontroller 110 when the vehicle 100 is turned on. The power supply 128 supplies limited power to some of the components of the microcontroller 110 after the vehicle 100 is turned off. For example, the power supply 128 supplies normal power (i.e., power received when the vehicle 100 is turned on) to the memory 124 for a predetermined period of time (e.g., a few hours or days) after the vehicle 100 is turned off. Accordingly, the code and data present in the memory 124 when the vehicle 100 is turned off is maintained (i.e., retained or preserved) in the memory 124 for the predetermined period of time after the vehicle 100 is turned off.

The first processor 120 may be shut down (i.e., turned off) when the vehicle 100 is turned off. Alternatively, instead of being turned off, the first processor 120 may operate in a power save mode (i.e., a low power mode) for the predetermined period of time after the vehicle 100 is turned off. In the power save mode, the first processor 120 may receive less than normal power (i.e., less than the amount of power received when the vehicle 100 is turned on). The second processor 122 continues to receive normal power (i.e., power received when the vehicle 100 is turned on) for the predetermined period of time after the vehicle 100 is turned off.

If the vehicle 100 is turned on within the predetermined period of time, only the first processor 120 may be powered up (or may exit the power save mode) since the memory 124 and the second processor 122 are already receiving normal power during the predetermined period of time. Accordingly, as soon as (i.e., without perceivable delay after) the vehicle 100 is turned on, the first processor 120 can begin executing the code available in the memory 124, and the subsystem 104 can begin operating.

This feature (i.e., the ability of the first processor 120 to begin executing the code available in the memory 124 as soon as the vehicle 100 is turned on) can be advantageous in the operation of many of the subsystems 104. For example, due to this feature, as soon as the vehicle 100 is turned on, the infotainment subsystem can begin outputting data (e.g., play music, display map, and so on); the safety subsystem can begin outputting data (e.g., display data from a rear view camera to facilitate reverse or backup operation of the vehicle 100); and so on.

If the vehicle 100 is not turned on within the predetermined period of time, all the components of the ECU 102 are shut down (i.e., powered down). Subsequently, when the vehicle 100 is turned on, the ECU 102 is rebooted (i.e., all the components of the ECU 102 are powered on), the code is reloaded into the memory 124, and the memory 124 is reallocated. Each subsystem 104 waits until the respective ECU 102 finishes rebooting and becomes operational after the respective ECU 102 is booted.

The rebooting of the ECU 102 and the consequent delay in the subsystems 104 becoming stable, usable, and operational; and a possibility of an unreliable/unsafe operation of the ECU 102 due to memory unavailability (i.e., memory usage exceeding a threshold) can be eliminated as follows. The first processor 120 can monitor times when the vehicle 100 is turned on and off. In other words, the first processor 120 can monitor usage of the vehicle 100. Based on the monitored times and usage of the vehicle 100, the first processor 120 can determine an optimum time of the day when the vehicle 100 is most unlikely to be in use (e.g., from midnight to 3 AM). In other words, the first processor 120 can determine, based on the monitored times and usage of the vehicle 100, an optimum time period during which the vehicle 100 remains turned off.

Additionally, the first processor 120 can monitor the usage of the allocated memory (i.e., memory usage) after a booting operation (i.e., before rebooting). Based on the monitored memory usage (i.e., based on the usage of the allocated portion of the memory 124), the first processor 120 can determine whether to perform a reboot operation during the optimum time period to reset (i.e., initialize) and reallocate the memory 124. The first processor 120 can generate an indication when an amount of memory used from the allocated portion of the memory 124 is greater than or equal to a threshold. The first processor 120 can monitor the memory usage and can generate the indication while operating in the normal mode when the vehicle 100 is in use as well as while operating in the power save mode during the predetermined time period after the vehicle 100 is turned off.

When the first processor 120 determines, based on the monitored memory usage, that the amount of memory used from the allocated portion of the memory 124 is greater than or equal to a threshold, the first processor 120 sends the indication to the second processor 122. Additionally, the first processor 120 sends to the second processor 122 the optimum time period during which the vehicle 100 remains turned off.

After the vehicle 100 is turned off, based on the memory usage indication, the second processor 122 turns on (or wakes up from the power save mode) the first processor 120 during the optimum time period during which the vehicle 100 remains turned off. The first processor 120 turns on (or wakes up from the power save mode) and performs an orderly shutdown of the ECU 102 and reboots the ECU 102 during the optimum time period during which the vehicle 100 remains turned off. After the ECU 102 is rebooted, the first processor 120 turns off or operates in the power save mode, and the power supply to the memory 124 is maintained (i.e., kept on).

During the rebooting operation, the first processor 120 initializes the memory 124, loads the code into the memory 124 for execution by the first processor 120 when the vehicle 100 is subsequently turned on, and reallocates portions of the memory 124 to the portions of the code. In other words, the rebooting operation resets the memory 124, and the first processor 120 reallocates the memory 124 following the rebooting operation. Further, any code to be executed by the first processor 120 after the vehicle 100 is later turned on, is reloaded into the memory 124 following the rebooting operation and is ready for execution by the first processor 120 when the vehicle 100 is turned on.

When the vehicle 100 is subsequently turned on, only the first processor 120 needs to turn on (or exit the power save mode and enter the normal mode where it receives normal power) since the memory 124 is already powered on, reallocated, and loaded with code and data necessary to control the subsystem 104. Accordingly, the subsystem 104 can begin operating immediately and without the delay that is normally associated with a booting operation that traditionally occurs when the vehicle 100 is turned on. Thus, when the vehicle 100 is turned on after the rebooting operation performed during the optimum time period during which the vehicle 100 remains turned off, the subsystem 104 becomes available for use or becomes operational in less time than when the ECU 102 is rebooted (i.e., cold started) after the vehicle 100 is turned on.

Further, since the memory 124 is initialized and reallocated during the rebooting performed while the vehicle 100 remains turned off, the ECU 102 can begin operating reliably using the reallocated memory 124 as soon as the vehicle 100 is turned on. This eliminates the possibility of an unreliable/unsafe operation of the ECU 102 due to memory unavailability (i.e., memory usage exceeding a threshold), which can occur without the above inventive procedure if the ECU 102 is not rebooted (i.e., cold started) when the vehicle 100 is turned on.

Thus, when the vehicle 100 is turned on after the reboot operation performed during the optimum time period during which the vehicle 100 remains turned off, the first processor 120 controls the subsystem 104 without rebooting. When the vehicle 100 is turned on after the reboot operation, the first processor 120 turns on or wakes up from the power save mode and controls the subsystem 104 using the memory 124 based on the code and data present in the memory 124 from before the vehicle 100 is turned on. In some implementations, the first processor 120 may perform the reboot operation in each instance of the optimum time period during which the vehicle 100 remains turned off.

Sometimes the memory usage may not exceed the threshold when the vehicle 100 is turned off, in which case the reboot operation is not performed during the optimum time period during which the vehicle 100 remains turned off. When the vehicle 100 is turned on prior to (or without) performing the reboot operation, the first processor 120 does not alter the allocation of the memory 124 from a prior reboot operation. Rather, the first processor 120 continues to operate without rebooting and by using the contents of the memory 124 from before the vehicle 100 is turned on. When the vehicle 100 is turned on prior to (or without) performing the reboot operation, the first processor 120 executes the code based on the memory allocation performed at a prior reboot operation. As the first processor 120 continues to execute the code, the usage of the allocated memory continues to grow, and the amount of memory available from the allocated memory continues to reduce. When the memory usage exceeds the threshold, a rebooting operation is performed as described above during the next instance of the optimum time period during which the vehicle 100 remains turned off.

Figure 2:
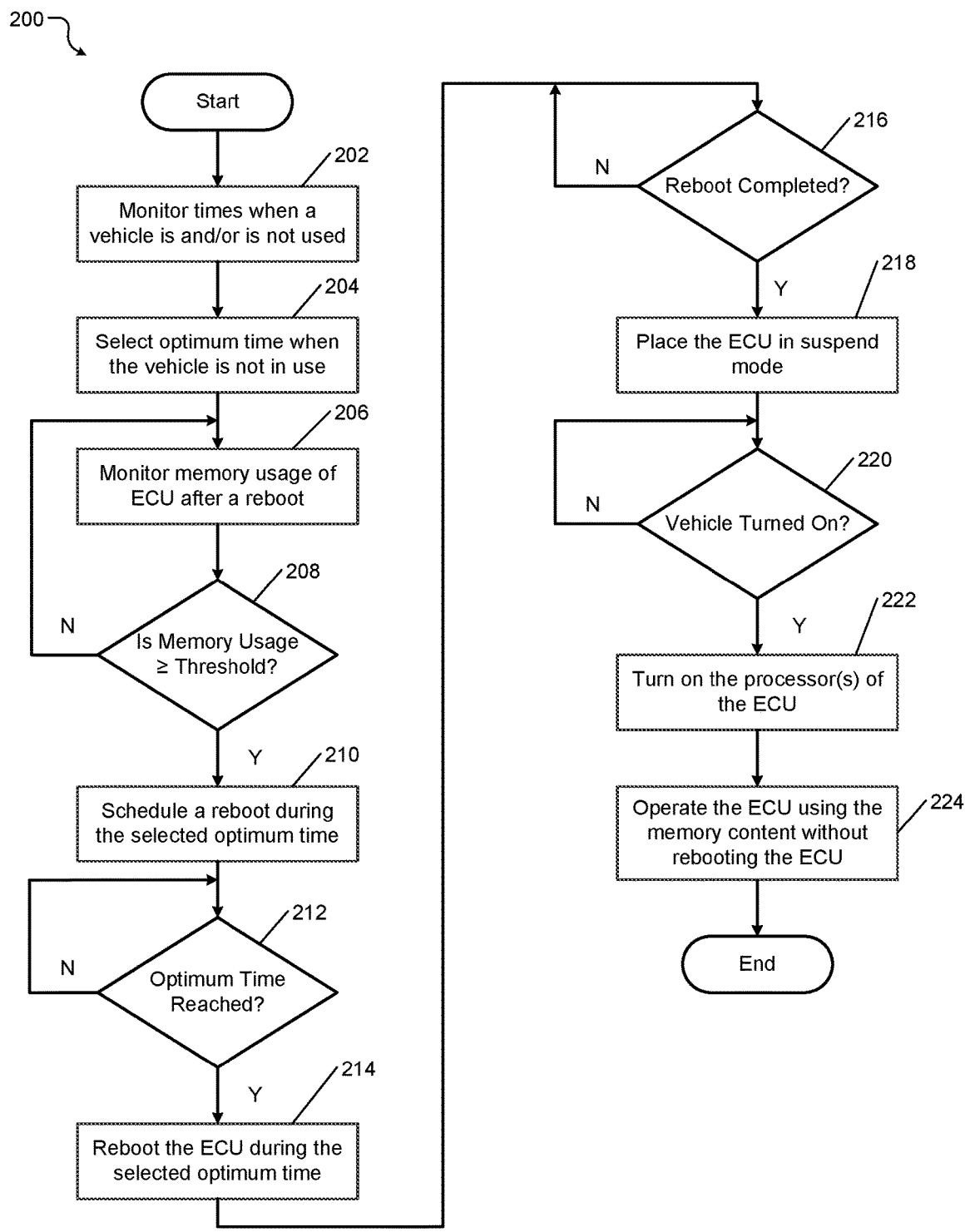
FIG. 2 is a flowchart of a method for operating the ECU according to the present disclosure.

FIG. 2 shows a method 200 for operating ECU's (e.g., the ECU's 102 of FIG. 1) according to the present disclosure. The control mentioned below may be implemented by the code and/or one or more components of the microcontroller 110 described above. At 202, control monitors times when a vehicle (e.g., the vehicle 100 of FIG. 1) is and/or is not used. At 204, control selects, based on the monitored times, an optimum time of the day when the vehicle is most likely to be not in use. At 206, control monitors memory usage of the ECU after the ECU is rebooted.

At 208, control determines if the memory usage is greater than or equal to a predetermined threshold. Control returns to 206 if the memory usage is less than the predetermined threshold. At 210, if the memory usage is greater than or equal to the predetermined threshold, control schedules a reboot operation for the ECU during the selected optimum time of the day. At 212, control determines if the optimum time of the day is reached (i.e., has arrived). Control waits until the optimum time of the day is reached. At 214, if the optimum time of the day is reached, control reboots (i.e., shuts down and reboots) the ECU during the selected optimum time of the day.

At 216, control determines if the reboot operation is completed. Control waits until the ECU is rebooted. At 218, control places the ECU in suspend mode, in which one or more processors of the ECU are turned off or placed in power save mode, and the memory of the ECU is kept powered on to retain its contents.

At 220, control determines if the vehicle is turned on. Control waits until the vehicle is turned on. At 222, if the vehicle is turned on, control turns on the one or more processors of the ECU. At 224, control operates the ECU using the contents of the memory without rebooting the ECU.

The teachings of the present disclosure can be used in embedded ECU's that do not automatically perform a full shutdown and reboot of the ECU memory configuration. An example use would be in automotive infotainment ECU's that utilize suspend technologies (such as suspend to RAM) to improve startup time. The suspended ECU automatically wakes up during a predefined time when the vehicle is expected to be turned off and unused (e.g., at 3 AM) and automatically performs a full shutdown, restart, and re-suspend sequence to fully reset the ECU's memory configuration to a known stable state. The sequence is performed at a time when the user is least likely to notice.

The refresh is performed based on a time at which there is a high probability that the vehicle is in an idle state and the refresh event will not be perceived by the user, the time being determined based on prior observations of the user's specific behavioral patterns. The refresh is enabled or trigged by a set of memory and uptime heuristics to ensure that the refresh is performed only when needed to ensure system integrity. The systems and methods of the present disclosure allow suspend technologies to be used in embedded ECUs to greatly improve startup time and perceived system quality while substantially reducing or eliminating system instability risks potentially arising from accumulations of memory leaks, corruptions, etc.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system for controlling a subsystem of a vehicle, the system comprising:
    a memory;
    a first processor configured to:
        control the subsystem of the vehicle;
        allocate, upon booting, a portion of the memory to perform operations to control the subsystem;
        generate an indication when an amount of memory used from the allocated portion of the memory is greater than or equal to a threshold;
        monitor times when the vehicle is turned on and off;
        determine, based on the times, a time period during which the vehicle remains turned off; and
        enter a power save mode after the vehicle is turned off while the memory continues to receive power after the vehicle is turned off; and
    a second processor configured to:
        continue receiving power after the vehicle is turned off; and
        after the vehicle is turned off, in response to receiving the indication from the first processor, wakeup the first processor from the power save mode during the time period in which the vehicle remains turned off;
    wherein the first processor is further configured to, in response to waking up during the time period and while the vehicle remains turned off:
        perform a reboot operation;
        reallocate the memory; and
        reenter the power save mode while the memory continues to receive power.

2. The system of claim 1 wherein when the vehicle is turned on after the reboot operation, the first processor is configured to control the subsystem based on data present in the memory from before the vehicle is turned on.

3. The system of claim 1 wherein when the vehicle is turned on after the reboot operation, the first processor is configured to wake up from the power save mode to control the subsystem using the memory without rebooting.

4. The system of claim 1 wherein when the vehicle is turned on after the reboot operation, the first processor is configured to control the subsystem without rebooting.

5. The system of claim 1 wherein when the vehicle is turned on prior to the reboot operation, the first processor is configured to:
    not alter allocation of the memory from a prior reboot operation; and
    continue to operate without rebooting and by using contents of the memory from before the vehicle is turned on.

6. The system of claim 1 wherein when the vehicle is turned on prior to the reboot operation, the first processor is configured to execute programs based on a memory allocation performed at a prior reboot operation.

7. The system of claim 1 wherein when the vehicle is turned on after the reboot operation, the subsystem becomes available for use in less time than if the first processor is rebooted after the vehicle is turned on.

8. The system of claim 1 wherein the first processor is configured to:
monitor a usage of the allocated portion of the memory since a prior reboot operation;
determine whether to perform the reboot operation during the time period based on the usage of the allocated portion of the memory; and
generate the indication based on determining whether to perform the reboot operation during the time period based on the usage of the allocated portion of the memory.

9. The system of claim 1 wherein the first processor is configured to:
determine a usage of the allocated portion of the memory during a time for which the first processor operates without rebooting; and
determine whether to perform the reboot operation during the time period based on the usage of the allocated portion of the memory.

10. The system of claim 1 wherein in response to the reboot operation, the first processor is configured to initialize the memory, load programs into the memory for execution by the first processor, and allocate portions of the memory to the programs.

11. A method comprising:
controlling a subsystem of a vehicle using a first processor, a second processor, and a memory;
allocating, using the first processor, upon booting, a portion of the memory to perform operations to control the subsystem;
generating, using the first processor, an indication when an amount of memory used from the allocated portion of the memory is greater than or equal to a threshold;
monitoring, using the first processor, times when the vehicle is turned on and off;
determining, using the first processor, based on the times, a time period during which the vehicle remains turned off;
operating the first processor in a power save mode after the vehicle is turned off;
continuing to supply power to the memory after the vehicle is turned off;
continuing to supply power to the second processor after the vehicle is turned off;
after the vehicle is turned off, in response to receiving the indication from the first processor, waking up the first processor from the power save mode during the time period in which the vehicle remains turned off; and
in response to waking up during the time period and while the vehicle remains turned off:
performing a reboot operation using the first processor;
reallocating the memory using the first processor; and
returning the first processor to the power save mode while continuing to supply power to the memory.

12. The method of claim 11 further comprising when the vehicle is turned on after the reboot operation, controlling the subsystem using the first processor based on data present in the memory from before the vehicle is turned on.

13. The method of claim 11 further comprising when the vehicle is turned on after the reboot operation:
waking up the first processor from the power save mode; and
controlling the subsystem using the first processor and the memory without rebooting.

14. The method of claim 11 further comprising when the vehicle is turned on after the reboot operation, controlling the subsystem using the first processor without rebooting.

15. The method of claim 11 further comprising when the vehicle is turned on prior to the reboot operation:
not altering allocation of the memory from a prior reboot operation; and
continuing to operate the first processor without rebooting and by using contents of the memory from before the vehicle is turned on.

16. The method of claim 11 further comprising when the vehicle is turned on prior to the reboot operation, executing programs using the first processor based on a memory allocation performed at a prior reboot operation.

17. The method of claim 11 further comprising when the vehicle is turned on after the reboot operation, making the subsystem available for use in less time than if the first processor is rebooted after the vehicle is turned on.

18. The method of claim 11 further comprising:
monitoring, using the first processor, a usage of the allocated portion of the memory since a prior reboot operation;
determining, using the first processor, whether to perform the reboot operation during the time period based on the usage of the allocated portion of the memory; and
generating, using the first processor, the indication based on determining whether to perform the reboot operation during the time period based on the usage of the allocated portion of the memory.

19. The method of claim 11 further comprising:
determining, using the first processor, a usage of the allocated portion of the memory during a time for which the first processor operates without rebooting; and
determining, using the first processor, whether to perform the reboot operation during the time period based on the usage of the allocated portion of the memory.

20. The method of claim 11 further comprising in response to the reboot operation, using the first processor:
initializing the memory;
loading programs into the memory for execution by the first processor; and
allocating portions of the memory to the programs.

* * * * *